May 26, 1936.  J. J. ENGELMAN ET AL  2,042,250

CAN BODY MAKING MACHINE

Filed Sept. 29, 1933   11 Sheets—Sheet 11

Patented May 26, 1936

2,042,250

UNITED STATES PATENT OFFICE 2,042,250

CAN BODY MAKING MACHINE

Joseph J. Engelman, John Henchert, and Greeley Baker, Chicago, Ill., assignors to Continental Can Company, Inc., New York, N. Y., a corporation of New York Application September 29, 1933, Serial No. 691,542

14 Claims. (Cl. 113—8)

The invention relates to new and useful improvements in machine for making can bodies and more particularly to a machine for making a body for a large square can having rounded corners.

An object of the invention is to provide a machine of the above type wherein the blanks from which the body is formed, after being placed on a receiving horse, are automatically fed on to a mandrel where the sides edges are automatically interlocked, after which the side seams are automatically bumped and closed and the completed can body discharged from the mandrel.

A further object of the invention is to provide a machine of the above type with a justifying means for locating the blanks relative to each other prior to bumping so as to insure proper alinement of the edges of the completed body.

A still further object of the invention is to provide a machine of the above type wherein the mandrel is expanded for interlocking the edges of a portion of the retracting movement of the feed bars which locate the body blanks on the mandrel and the mandrel is contracted by the lifting movement which releases the body blanks after the bumping operation.

These and other objects will in part be obvious and will in part be hereinafter more fully disclosed.

The invention relates to a machine for making can bodies such as five-gallon or large size square can bodies. The can body is made of two blanks, the edges of which are interlocked and bumped to form a side seam, this joining the two sections. These interlocked sections are afterwards soldered. The edges of the blanks are joined at the rounded corners of the can body.

In the drawings, one of the blanks is indicated at A and the other at B. The edge portion of the blank A is inturned as indicated at $a$ and is outturned as indicated at $b$. The edge portion of the blank B is outturned at $c$ and is inturned at $d$.

Figure 19:
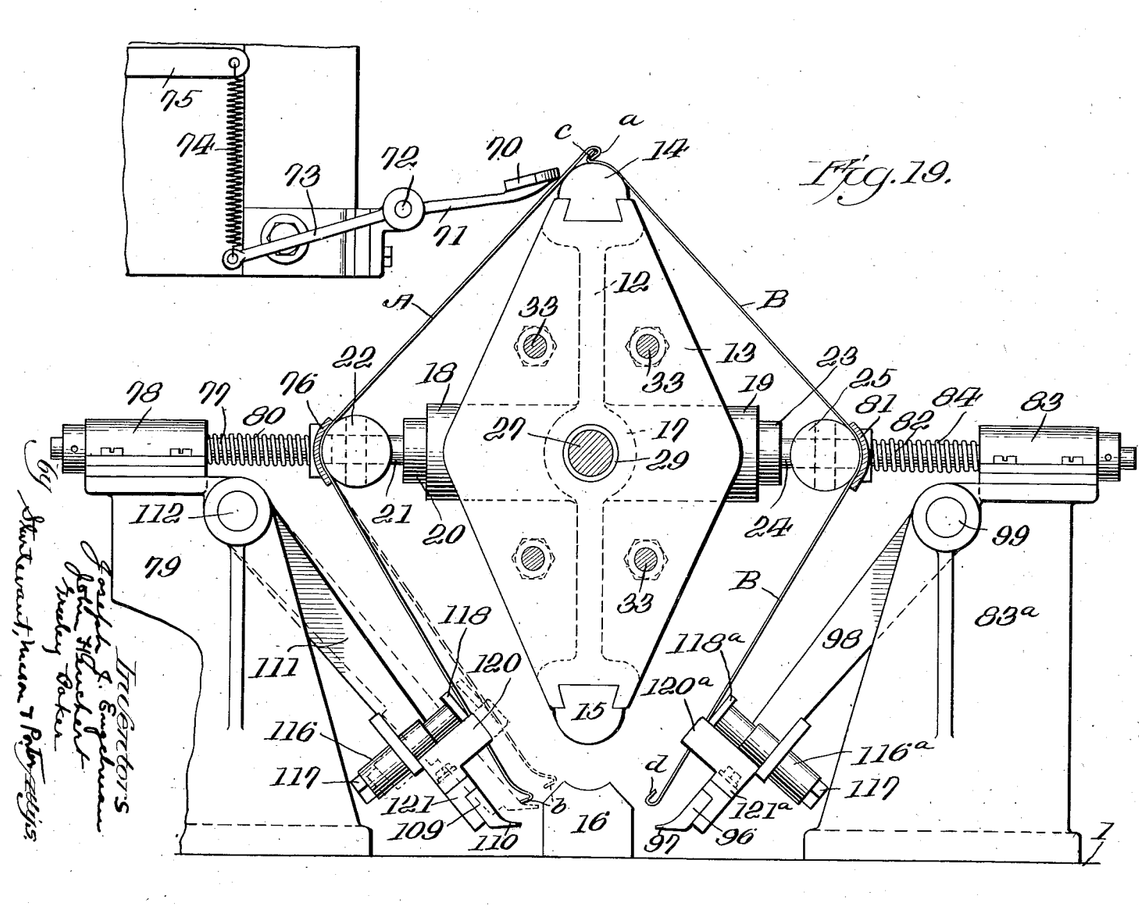
Fig. 19 is a view showing more or less diagrammatically the mandrel with the body blanks placed thereon and alined preparatory to the interlocking of the lower hooked portion thereof, also showing in dotted lines the lifting of the portion carrying the inner hook.
Figure 20:
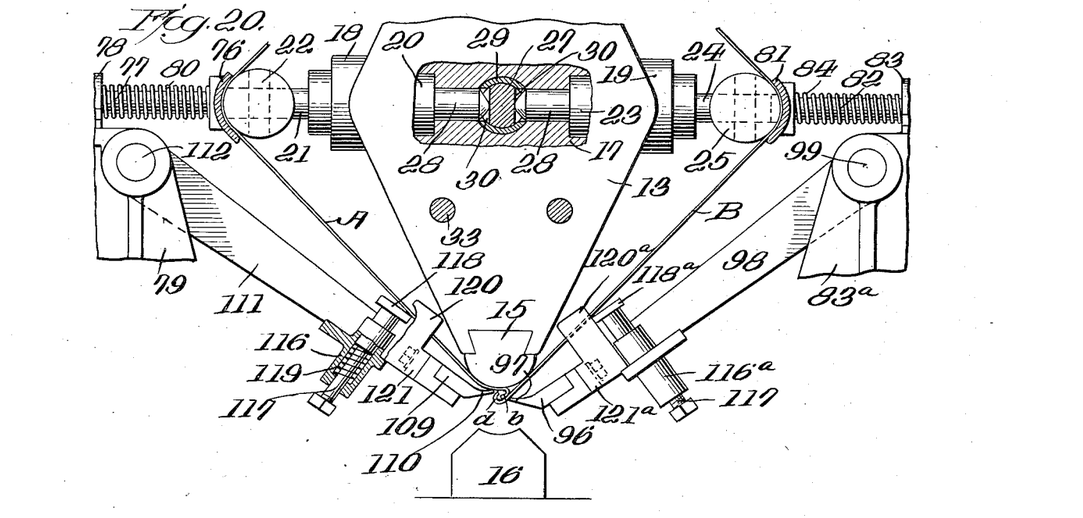
Fig. 20 is a view partly in section showing the hooks interlocked and the lower bumper in engagement therewith.
Figure 21:
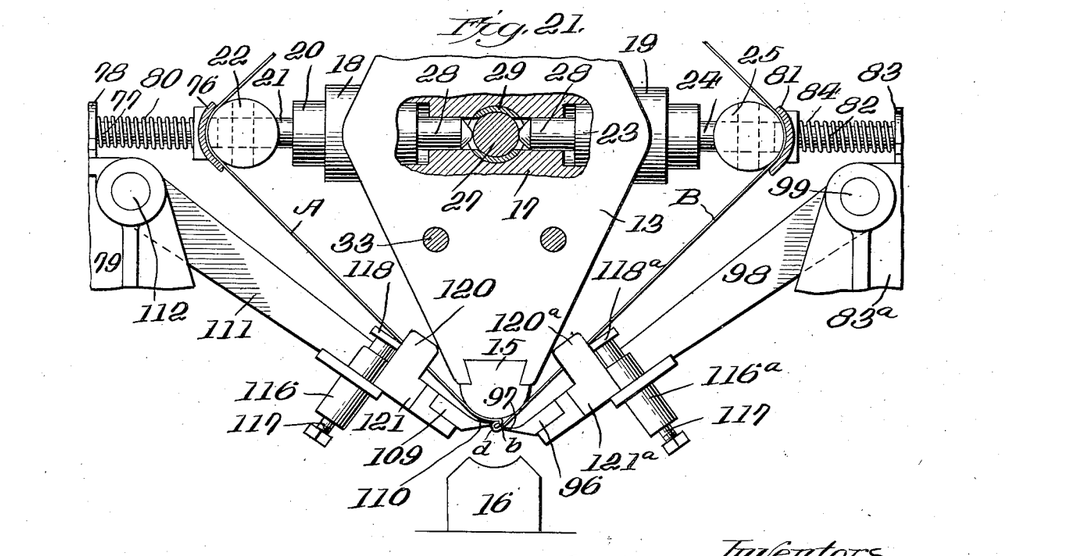
Fig. 21 is a view similar to Fig. 20, but showing the mandrel fully expanded and the hooks fully interlocked for bumping.
Figures 22, 23, 24:
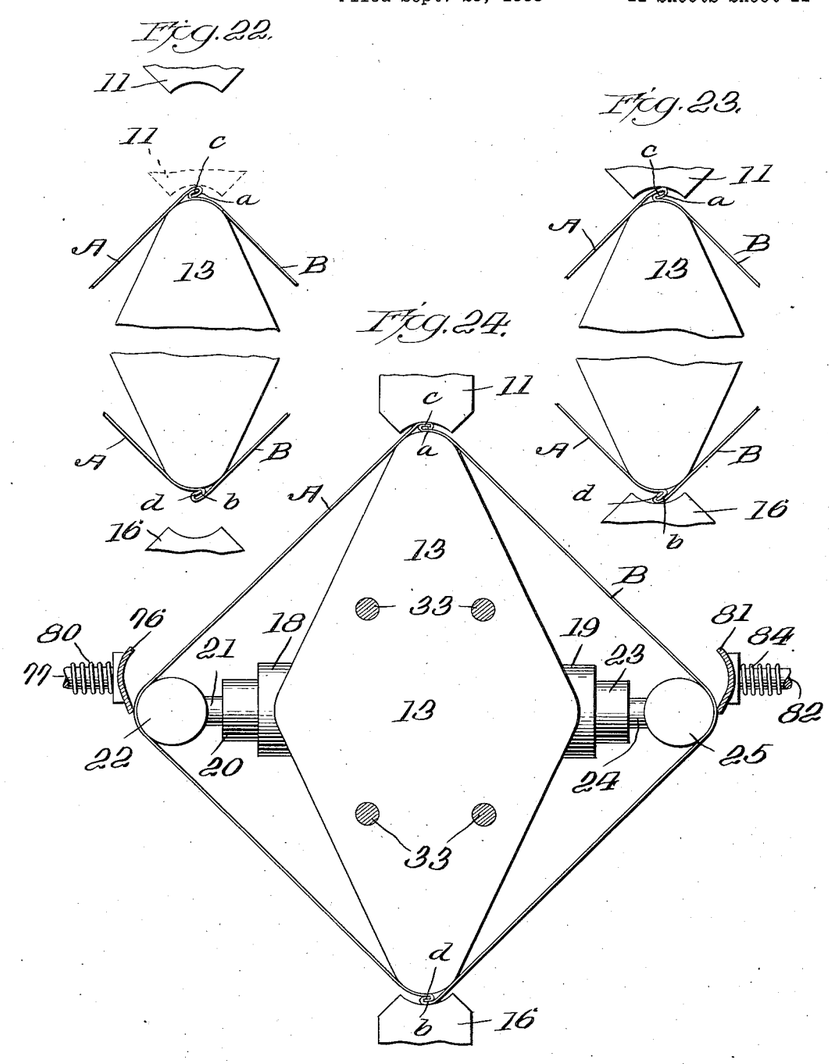
Fig. 22 is a diagrammatic view showing in full lines the position of the punch and the relation of the mandrel and blanks to the die when the edges of the blanks are fully interlocked preparatory to bumping, and in broken lines the punch as having moved down into contact with the interlocked edges at the upper part of the body.
Fig. 23 is a similar view showing the mandrel as having moved down with the punch and the lower interlocked edges brought into contact with the anvil preparatory to the bumping of the two side seams.
Fig. 24 is a view showing diagrammatically the complete bumping of the side edges.

The hooks $a$ and $c$ are interlocked and bumped to form one of the side seams, and the hooks $b$ and $d$ are interlocked and bumped to form the other side seam. The hooks $a$ and $c$ are first interlocked as shown in Fig. 19. This is accomplished by a previous operation, and then the hooks $b$ and $d$ are interlocked automatically, as shown in Figs. 20 to 23, after which they are bumped simultaneously as shown in Fig. 24.

With the above understanding of the purpose of the machine, the mechanism for carrying out the interlocking and bumping of the side seams will be described in detail. The machine consists of a frame including a base member 1 mounted on supporting legs 2, 2, and an upright U-shaped portion 3 which is preferably formed integral with the base member. Mounted for rotation in the upright U-shaped portion 3 is a main shaft 4 which is driven by a suitable belt wheel 5 with which is associated an idler 6. The shaft 4 carries a gear 7 which meshes with a gear 8 on a shaft 9. Mounted for reciprocation in the U-shaped upright frame member 3 is a punch head 10 carrying a main punch or bumper 11. The punch head is reciprocated on the frame by a crank on the shaft 9 which is connected to the punch head 10 in the usual manner.

Located beneath the punch 11 is a mandrel on which the can body blanks are placed for bumping for interlocking the side seams thereof. The mandrel consists of a central vertical web portion 12 which is preferably formed integral with a supporting plate 13. Said vertically extending web member 12 is provided with an auxiliary anvil 14 at the upper side thereof, which anvil is connected to the web through a dove-tailed shaping of the parts. The upper side seam is bumped on this auxiliary anvil by the bumper or punch 11. At the lower portion of the web 12 there is an auxiliary bumper 15 which cooperates with a main stationary anvil 16 for the bumping of the lower side seam.

Figures 8, 9, 10:
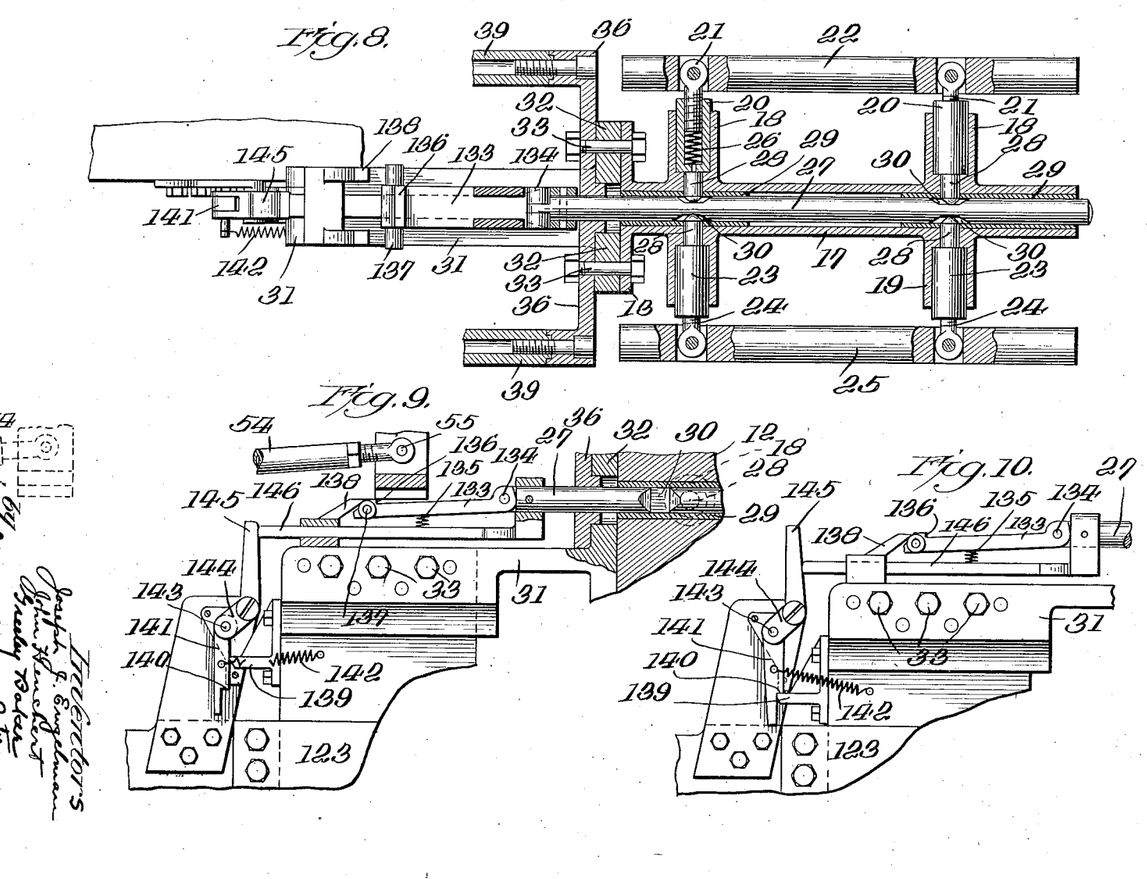
Fig. 8 is a sectional horizontal view through a portion of the mandrel and showing said mandrel as contracted ready to receive the body blanks.
Fig. 9 is a vertical sectional view through a portion of the mandrel and the means for expanding the same, showing the expanding means in position so that the mandrel is fully expanded.
Fig. 10 is a view of the expanding means showing the parts connected for releasing and contracting the mandrel.

Centrally of the web 12 is a sleeve 17 (see Figures 8 and 19). This sleeve 17 is provided with laterally projecting arms 18, 18 at one side thereof and laterally projecting arms 19, 19 at the other side thereof. The arms 18 are recessed, and disposed in said recesses are sleeve members 20, 20. Located in these sleeve members 20, 20 are rods 21, 21 which carry the side expanding members 22 of the mandrel. The projecting arms 19, 19 are likewise provided with sleeves 23, 23 which carry rods 24, 24 on which are mounted the side expanding member 25 of the mandrel. These side expanding members 22 and 25 engage the can body blanks intermediate their locked edges, and are moved outward away from each other at the proper time for interlocking the hooked edges at the lower side seam. The rods 21 are threaded into their respective sleeves so that they may be adjusted thereon. Located within each sleeve is a spring 26 which bears against the end of the rod and serves merely as a tensioning means to prevent the sleeve from turning on the rod.

The mandrel is expanded for interlocking the hooks forming the lower side seam by a control rod 27. Associated with each of the sleeves 20, 20 and 23, 23 is a pin 28 having a rounded inner end. The control rod 27 slides in bushings 29, 29 disposed within the sleeve 17. The control rod has a recess in each side face thereof in the region of each pin 28. These recesses are indicated at 30. The ends of the recesses are cam-shaped or inclined. When the rod is in the position shown in Fig. 8, then the recesses 30 are opposite their respective pins 28, and the pins are released so that the side members 22 and 25 of the mandrel may move inward to their extreme inner position. When, however, the rod is moved to the position shown in Fig. 9, then the inclined or cam face at the end of the recess will engage the rounded inner ends of the pins 28, forcing the same outward, and this will expand the mandrel for purposes which will be hereinafter described.

The mandrel is supported by the plate 13 which is located at one end thereof as shown in Fig. 8. This plate is bolted to a bracket 31 which carries upright members 32, 32 and the plate is secured thereto by clamping bolts 33, 33. Also carried by this bracket 31 is a receiving horse or support on which the can body blanks are placed and along which they are fed on to the mandrel. This receiving horse includes an upper body supporting member 34 secured by a bolt 35 to the end member 36 of the receiving horse. This end member 36 is in turn clamped to the upright members 32 by means of bolts 37. There is a second end member 38 (see Fig. 1) which is connected to this upper supporting member 34. At opposite sides of the receiving horse are supporting members 39, 39. These supporting members are likewise bolted to the end member 36 and are also connected to the end member 38. The supporting member 34 for the body blanks and also the side members 39 project beyond the end member 38 and terminate adjacent a rest 40. This rest 40 is carried by a bracket 41 attached to a centrally projecting frame member 42 which in turn is fixed to the base 1 by suitable clamping bolts. This receiving horse being carried by the bracket 31 which also supports the mandrel, has a slight up and down movement with the mandrel when said mandrel is moved into position for the bumping of the side seams. The rest member 40, however, has no up and down movement.

Figure 1:
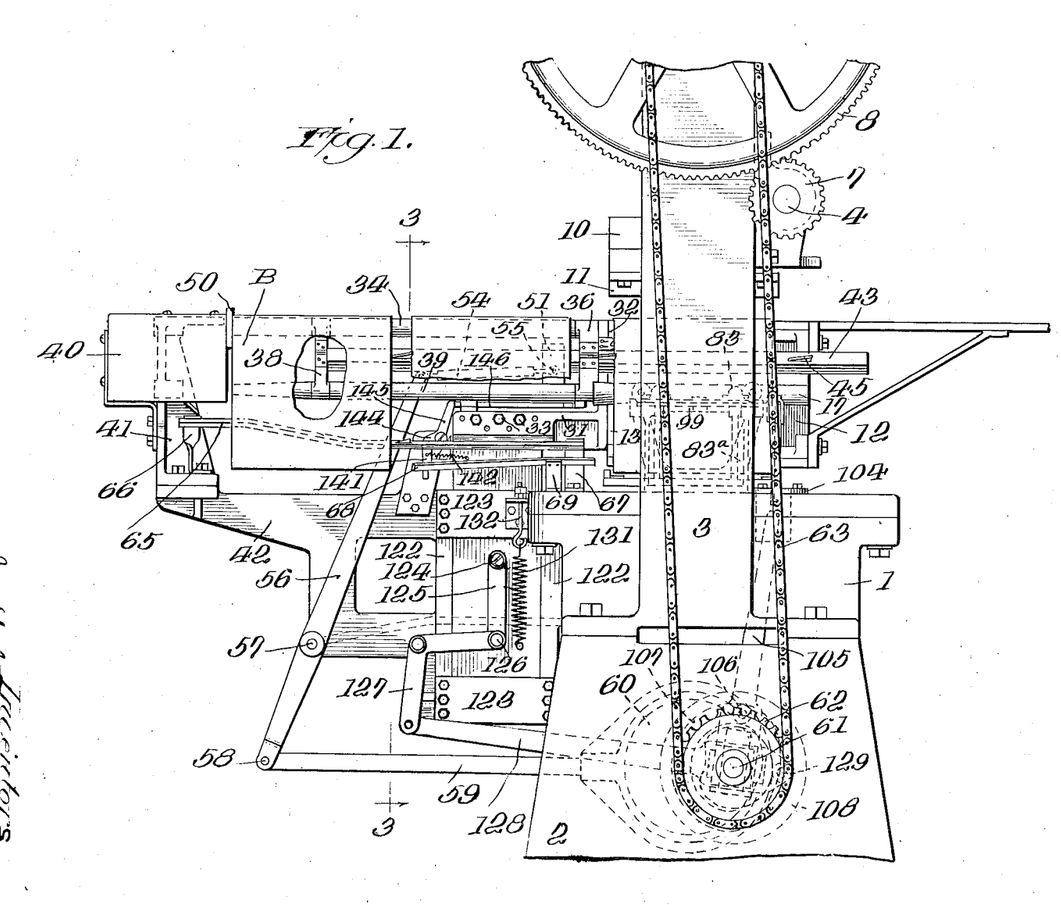
Figure 1 is a side view of a portion of the machine embodying the invention.
Figure 17:
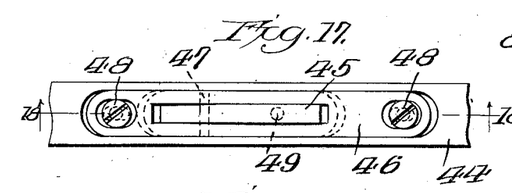
Fig. 17 is a plan view of a portion of one of the feed bars.
Figure 18:
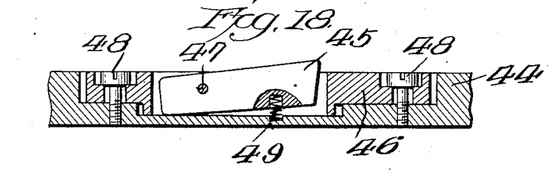
Fig. 18 is a sectional view on the line 18—18 of Fig. 17.

The operator manually interlocks the upper edges $a$ and $c$ of the body blanks and places the same on the upper supporting member 34 of the receiving horse, as shown in Fig. 1. The body blanks are then fed forward step by step along the receiving horse and on to the mandrel. This is accomplished by feed bars. There are two feed bars, one is indicated at 43 and the other at 44. These feed bars 43 and 44 slide in suitable guiding bearings in the end members 36 and 38. Each feed bar is provided with a series of yielding feed dogs 45. These feed dogs are shown in detail in Figures 17 and 18. Each feed dog 45 is pivoted in a recess formed in a plate 46. The feed dog is pivoted at 47. The plate 46 is secured to its feed bar by means of bolts 48, 48. These bolts pass through elongated slots in the plate 46 and thus permit the plate to be shifted in an endwise direction in the feed bar. This provides a means whereby each feed dog may be independently adjusted on its feed bar, and thus all of the feed dogs properly positioned for engagement with the body blanks. There is a spring 49 disposed beneath the feed dog which normally lifts the feed dog above the face of the feed bar, so that it will, when moved to the right, as viewed in Fig. 18, contact with the body blank supported on the horse and slide the same along the horse. The feed bars have a reciprocating movement, and as they move forward, the feed dogs will engage the body blanks for imparting the forward step movement thereto. On the retracting movement of the feed bar, the dog will yield and slide underneath a body blank so as to be brought into engagement therewith as soon as it passes the blank for imparting the feeding movements thereto.

The feed bars extend all the way underneath the first blank, as shown in Fig. 1, when they are fully retracted, so as to engage said blank for moving it forward. There is a gauge plate 50 against which the body blanks are placed by the operator preparatory to the feed dog engaging the same to feed it forward. The feed bars extend to the right all the way through the mandrel, and the feed dogs operate not only to place the blanks on the mandrel, but also to strip the finished can body from the mandrel after the side seams have been bumped.

The feed bars are moved back and forth by the following mechanism. Each feed bar is bolted to a bracket 51 (see Fig. 7). Said bracket is attached to a depending cross head 52 which is secured to the bracket by suitable bolts 53, 53. Attached to this cross head 52 is a link 54. Said link is pivoted to the cross head by a pivot bolt 55. The other end of a link is attached to a lever 56. This lever 56 is pivoted at 57 to the centrally projecting frame member 42. The lever at its lower end is pivoted at 58 to an eccentric strap 59 cooperating with an eccentric 60 on the cross shaft 61. Said cross shaft 61 carries a sprocket wheel 62, and a sprocket chain 63 running over said sprocket wheel 62 also engages a sprocket wheel 64 on the shaft 9. This provides a means whereby the shaft 61 is rotated, and said shaft as it rotates through the eccentric strap 59 will oscillate the lever, and the lever through the link connection to the cross head will move the feed bars back and forth.

Figure 2:
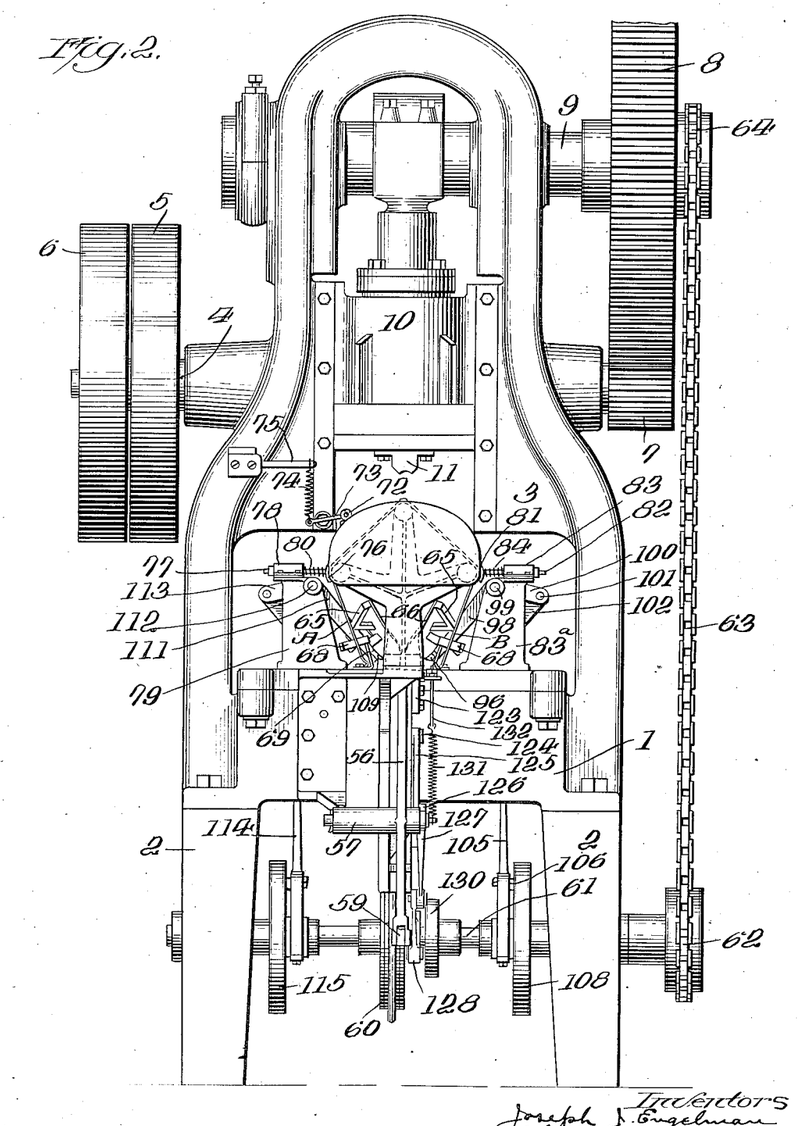
Fig. 2 is an end view from the feeding-in side of the machine.
Figure 3:
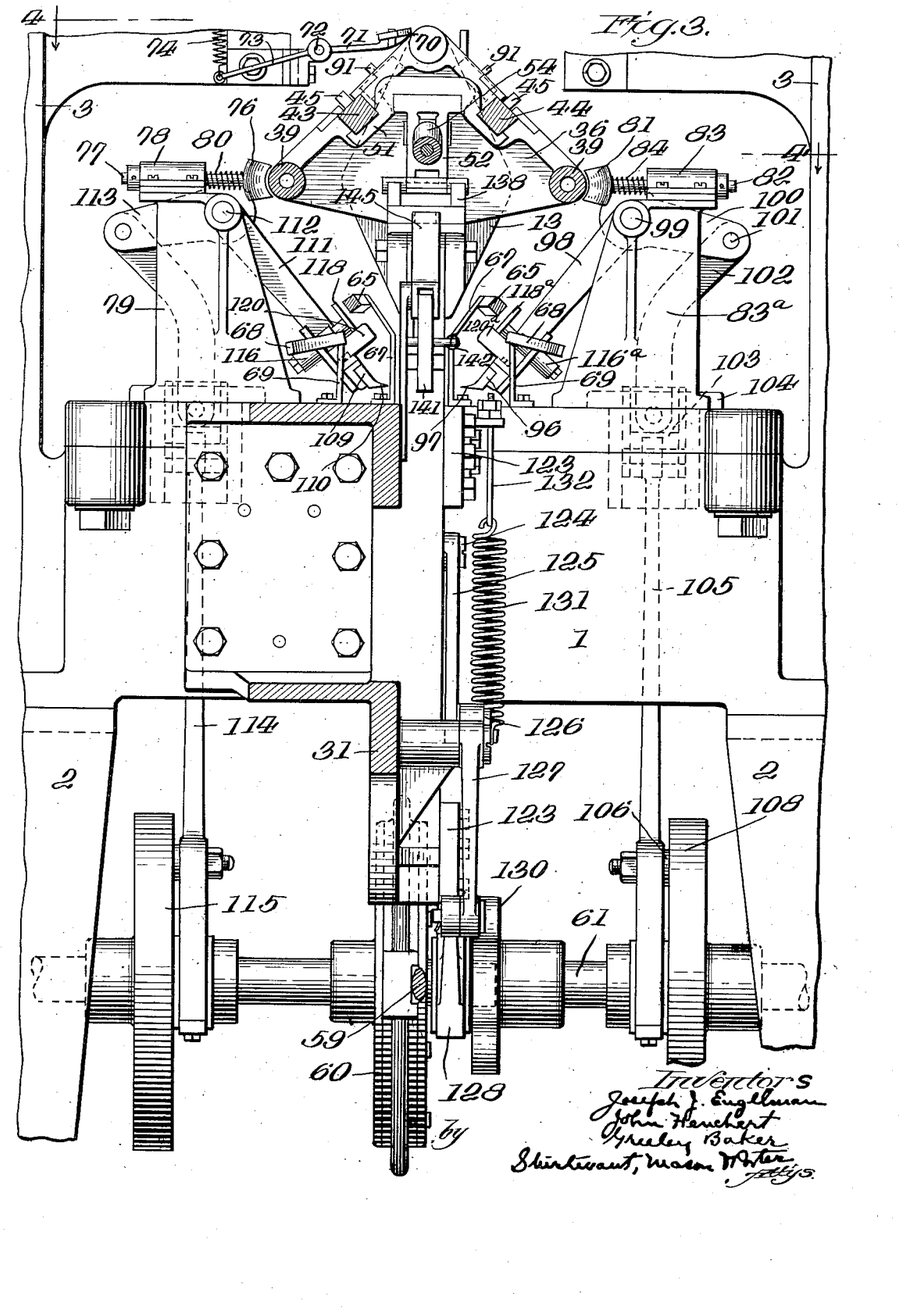
Fig. 3 is a sectional view on the line 3—3 of Fig. 1.

There is a guide bar 65 at each side of the machine on which the body blanks rest. This guide bar is attached to a bracket 66 at the outer end thereof and to a bracket 67 at the inner end thereof. The guide bar is shaped so that when the body blanks are first placed on the receiving horse, the hooked edges are quite widely separated as shown in Fig. 2. There is also a guide bar 68 at each side of the machine. These guide bars are carried by brackets 69. The guide bars 68 incline away from the guide bars 65 at their receiving end, and the guide bars are so shaped that as the body blanks with their upper hooked edges interlocked move along the supporting horse, the lower hooked edges will be gradually brought close together, as shown in Fig. 19. The body blanks as they are fed along the receiving horse step by step by the reciprocating movement of the feed bars will be finally conveyed on to the mandrel with the hooked edges a and c resting on the upper anvil 14 of the mandrel, and with the intermediate portions of the body blanks contacting with the side supporting members 22 and 25.

Figure 4:
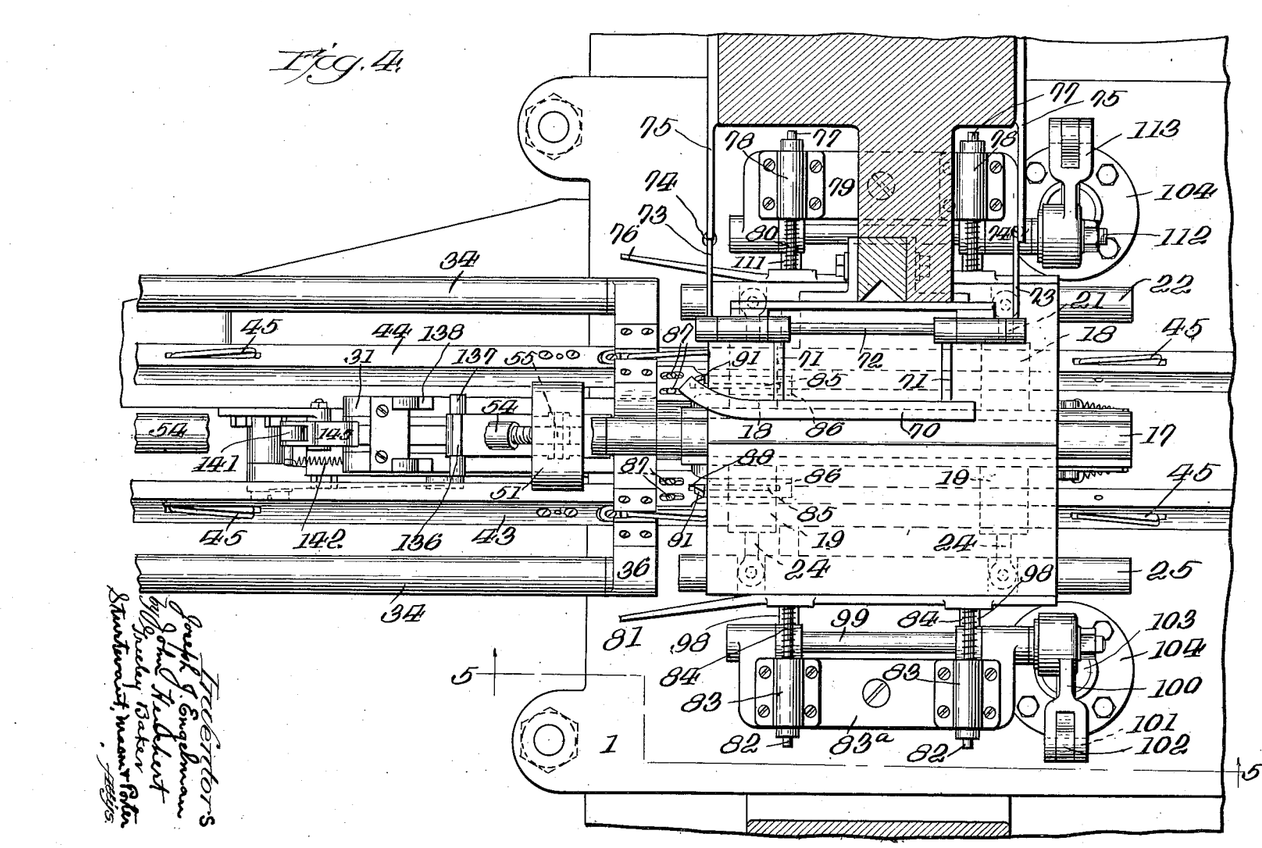
Fig. 4 is a view partly in plan and partly in section on the line 4—4 of Fig. 3.

Associated with the mandrel is a yielding presser bar 70 which is mounted on spaced arms 71, 71 fixed to a shaft 72 (see Fig. 4). Attached to the shaft 72 is an arm 73 which in turn is connected to a spring 74 attached at its upper end to a fixed arm 75 carried by the frame of the machine. Thus it is that the presser bar 70 is yieldingly pressed toward the anvil 14 of the mandrel. The receiving end of the presser bar is curved away from the mandrel, so that when the body blanks are fed forward on to the mandrel, they will be fed beneath the presser bar, and this presser bar will yieldingly hold the interlocked hooked portions in contact with the anvil 14.

Associated with the side expanding member 22 is a presser shoe 76. Said presser shoe 76 is carried by rods 77, 77 sliding in sleeve bearings 78, 78 carried by a bracket 79 attached to the frame of the machine. There is a spring 80 surrounding the rod and bearing against the shoe and also the bearing sleeve, and this spring serves to yieldingly press the shoe into contact with the expanding member 22. The receiving end of the presser shoe 76 is curved away from the mandrel and overlies the horse along which the body blanks are moved by the feed bars, and therefore, the body blank will be moved in between the presser shoe 76 and the supporting member 22, as shown in Fig. 19. This spring pressure of the shoe is sufficiently light to permit the sliding of the body blank A in between the shoe and the supporting member 22, while it will at the same time cause the rounded portion of the body blank which has been pre-shaped to engage said rounded expanding member 22.

Associated with the side supporting member 25 is a similar presser shoe 81 carried by rods 82 and sliding in sleeve bushings 83 carried by brackets 83a. Springs 84 surround the rods and yieldingly force the shoe 81 into contact with the expanding member 25. This shoe 81 is likewise curved and bent outwardly at its receiving end so as to expand beyond the supporting horse and to guide the section B of the body blank on to the mandrel.

Figure 15:
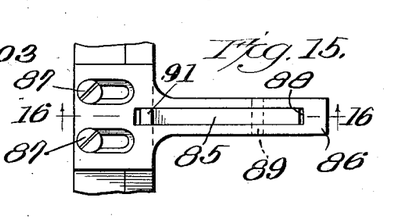
Fig. 15 is a plan view of one of the justifying gauges for positioning the body blanks to aline the edges thereof.
Figure 16:
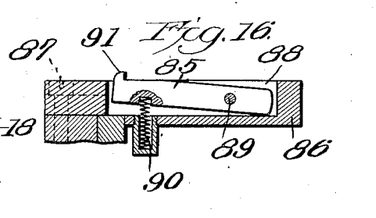
Fig. 16 is a sectional view on the line 16—16 of Fig. 15.

After the body blanks have been placed on the mandrel by the feed bars, it is essential to position said blank so that the end edges thereof will be in alinement. This is accomplished by the justifying mechanism which includes a gauge finger 85. There is a gauge finger at each side of the mandrel. The gauge fingers are mounted in brackets 86 which are secured to the upright members 32 which support the plate carrying the supporting members of the mandrel. This bracket 86 is secured to the upright member 32 by bolts 87 passing through slots which permit said bracket to be shifted for properly positioning the gauge fingers. The brackets supporting the gauge fingers are independently adjustable. This bracket and the gauge finger carried thereby is shown more in detail in Figures 15 and 16. The bracket has a recess 88 therein in which the gauge finger is mounted on a supporting pivot 89. A spring 90 tends to lift the end 91 of the gauge finger above the face of the bracket. The left-hand end of this gauge finger is rounded and when the body blank is fed along the horse on to the mandrel, it will depress the gauge finger 85 and pass over the gauging end 91 thereof. The spring will at once raise the gauge finger to the position shown in Fig. 16, after the blank has passed beyond this gauging end.

Figure 5:
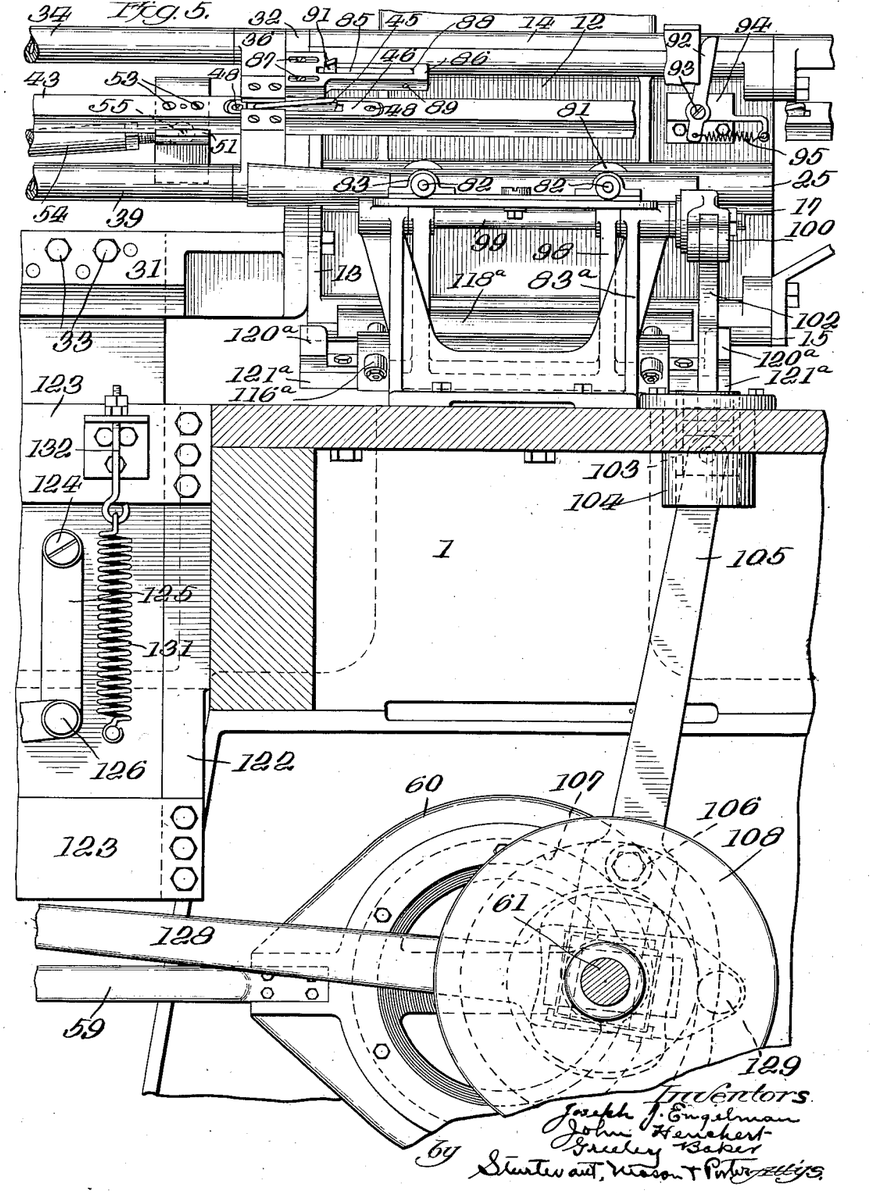
Fig. 5 is a sectional view on the line 5—5 of Fig. 4.

Cooperating with each gauge finger 85 and forming a part of the justifying mechanism is an arm 92. The arm 92 is pivoted at 93 to a bracket 94 carried by the central web of the mandrel. A spring 95 connected to a lug on the bracket and to the lower end of the arm, normally forces the arm in a counter-clockwise direction as viewed in Figures 5 and 6. There are two arms, one engages one section of the body blank while the other engages the other section of the body blank. As the feed bars move the body blanks over the gauge fingers 85, they are brought into contact with these arms 92, which yield, and as soon as the feed dog is retracted, the body blanks will be moved to the left, as viewed in Figures 5 and 6, and their left-hand edges brought into engagement with the gauge fingers 85. This positions the edges of the body blanks in alinement, and they will stay thus positioned due to the fact that there are yielding shoes pressing against the same. These arms 92 will yield to permit the finished body blank to pass over the same, and there is, of course, a stop for limiting the movement of the arm 92 through the action of the spring thereon, holding the same properly positioned for engagement with the body blanks.

The means for interlocking the hooked edges to form the lower side seam, as viewed in the drawings, includes swinging wings. These wings are similar in construction, although slightly differently timed in their movements. The wing member 96 is in the form of a bar extending substantially from one end to the other of the anvil or bumper 15. This bar 96 has a relatively thin projecting edge portion 97 which contacts with the body blank B adjacent the hooked end thereof (see Figures 20 and 21). The bar is mounted on arms 98, 98 which are attached to a shaft 99. The shaft 99 carries an arm 100 which is pivoted at 101 to a link 102. The lower end of the link 102 is pivoted to a crosss head 103 which slides vertically in a bushing 104. The bushing 104 carries a pin 104a engaging a groove in the cross head so that it is held from rotating in the bushing. Attached to the cross head is a rod 105 (see Figures 5, 11 and 12). The rod 105 has a forked end straddling the shaft 61. It also carries a roller 106 which runs in a cam groove 107 formed in a disk 108 which is fixed to and rotates with the shaft 61. As the shaft rotates, it will reciprocate the rod 105 and this will impart reciprocations to the cross head 103 and oscillations to the shaft 99 so as to bring the bar at the proper time into contact with the body blank section B for the purpose of bringing about the interlocking of the hooked end thereof with the hooked end of the body blank A.

Figure 11:
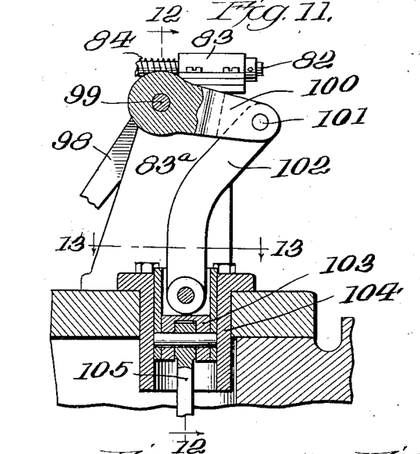
Fig. 11 is a view in vertical section showing the operating device for one of the wings which interengage the hooks forming the lower side seam of the can body.
Figure 12:
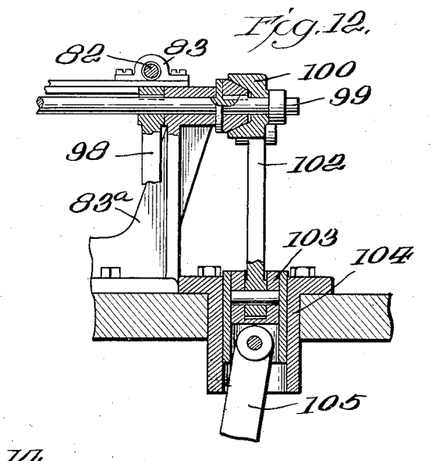
Fig. 12 is a sectional view on the line 12—12 of Fig. 11.
Figures 13, 14:
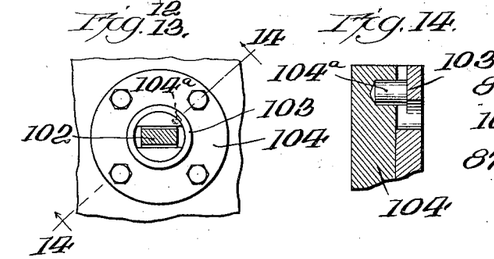
Fig. 13 is a sectional view on the line 13—13 of Fig. 11.
Fig. 14 is a sectional view on the line 14—14 of Fig. 13.

Cooperating with the blank A is a similar bar 109. Said bar has a similarly shaped thin edge 110 which contacts with the body blank A at a short distance from the hooked end thereof. This bar 109 is carried by arms 111 mounted in a shaft 112. The shaft 112 carries an arm 113 (see Fig. 2), and this arm 113 is oscillated from a rod 114 through a cross head and link connection such as shown in Figures 11 and 12. The rod 114 carries a roller running in a cam groove in a disk 115. Attached to the arm 111 is a sleeve 116 in which is mounted for endwise movement, a rod 117. There is a similar sleeve on each arm and connecting the outer ends of the rods 117 is a bar 118. There are springs 119 in each sleeve which force the rods upwardly and outwardly away from the arms. This will yieldingly press the bar in an upward direction, and the movement of the bar is limited.

Mounted on the arms 111 is a gauge bar 120 provided at its opposite ends with gauge fingers 121. Attached to the arms 98 are similar sleeves 116a carrying rods supporting a bar 118a, and also attached to the arms 98 is a gauge bar 120a carrying gauge fingers 121a.

When the body blanks are first fed on to the mandrel, these wing members are in the position shown in Fig. 19. The wing members are so timed that the one at the left, as viewed in this figure, will first contact with and lift the lower portion of the body blank for moving the same upward into contact with the anvil 15. The swinging wing member at the right will contact with the lower portion of the body blank B and bring the same upward and into contact with the anvil 15, but so as to place the hooked ends on the two body blanks for interlocking engagement. The yielding bars 118 and 118a contacting with the body blank will cooperate with the edge portions 97 and 110 of the bars 96 and 109, respectively, in the holding of the edge portions of the body blanks A and B against the anvil, and with the hooks positioned for interlocking engagement. The gauge fingers 121 and 121a at the receiving side of the mandrel justify the position of the edges of the blanks and insure that they shall be in alinement when they are interlocked and bumped at this lower seam. After the wing members have placed the lower edge portions of the body blanks in the position shown in Fig. 20, then the mandrel is expanded for causing said edge portions to be interlocked with each other, as shown in Fig. 21. This is accomplished by the endwise movement of the control bar 27.

After the mandrel has been expanded, and the interlocked edge portions drawn into firm gripping contact with each other, then the mandrel is lowered and the punch 11 also moved into engagement with the body blank for the bumping of the side seams. The bracket 31 carrying the upright members 32 on which the mandrel and also the supporting horse are mounted, is in turn mounted for a limited raising and lowering movement. Said bracket extends between said members 122, 122, which are connected by cross plates 123, 123, and this provides a housing in which the bracket may be moved vertically. Attached to the bracket is a pin 124. A link 125 is attached to this pin, and is also pivoted at 126 to an elbow lever 127. The elbow lever 127 is in turn pivoted to a rod 128 which is forked to straddle the shaft 61. The rod 128 carries a roller 129 bearing against the face cam on a disk 130 attached to the shaft 61 (see Fig. 2). When the rod 128 is moved in an endwise direction to the right, it will raise the bracket 31, and when moved in an endwise direction to the left, as viewed in this figure, it will permit the bracket to lower. A spring 131 is attached to the bracket 31 at its lower end, and to a hanger 132 at its upper end. This spring tends to lift the bracket 31 and the parts carried thereby and serves as a counterbalancing means for reducing the power applied to the rod 128 for raising the anvil and lowering the same.

The raising and lowering of the mandrel is timed so that when the bumping member 11 has descended to a point where it contacts with the interlocked portions of the side seam at the upper side of the body, then the mandrel will move downwardly, bringing the interlocked portions of the side seam into contact with the mandrel 16. In Fig. 22 of the drawings, the punch or bumper 11 is shown in broken lines as brought into engagement with the interlocked parts of the upper side seam preparatory to the downward movement of the mandrel. In Fig. 23, the punch or bumper 11 and the mandrel have moved downward bringing the interlocked portions of the lower side seam into contact with the mandrel 16. Then it is that the upper bumper or punch 11 will force the bumper or anvil 15 of the mandrel into contact with the interlocked parts of the lower side seam, bumping and finishing the interlocking of the parts. This downward movement of the mandrel is limited by this lower anvil, and the punch will then press the upper interlocked parts against the upper anvil 14 and complete the upper side seam. The two side seams are compressed and substantially completed at the same time. This downward movement of the anvil moves the side members 22 and 25 away from the associated presser shoes, as shown in Fig. 24. The cams operating the wing members are so shaped as to permit this downward movement of the mandrel while the wings still bear on the body blanks. There is sufficient lost motion in the means which raises and lowers the anvil to permit the mandrel to move during the final bumping or pressing operation. The presser bar 70 is limited in its downward movement so that the anvil 14 can move away from the same on the downward movement of the mandrel, and thus the presser bar does not, in any way, interfere with the bumping action.

Figures 6, 7:
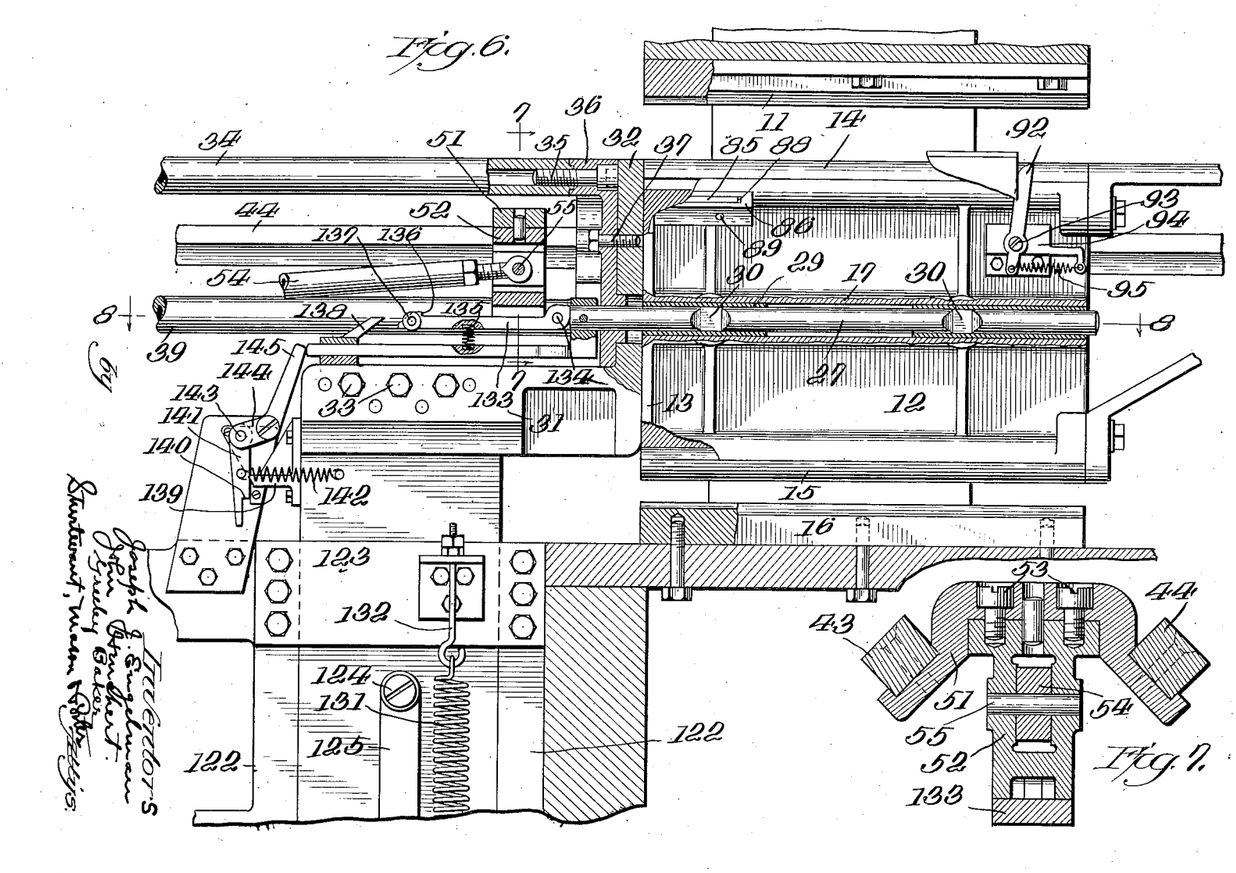
Fig. 6 is a view partly in section and partly in elevation showing the mandrel and the means for expanding and contracting the same.
Fig. 7 is a sectional view on the line 7—7 of Fig. 6.

The control rod 27 is moved into position for expanding the mandrel by a portion of the retracting movement of the feed bars. Pivotally attached to the control bar 27 is a latch 133. Said latch is pivoted at 134 to the control bar. There is a spring 135 which normally lifts the latch to a position so that the cross head 52 will engage a lip 136 carried by said latch. As shown in Fig. 7, this latch underlies the cross head, and it is the side end walls thereof which contact with the lip. There is a roller 137 on the latch which engages a fixed cam finger 138 for releasing the latch from engagement with the cross head. As the cross head moves to the left, as viewed in Fig. 6, after the body blanks have been positioned on the mandrel, it will come into contact with the lip 136, causing the mandrel to be expanded. The roller 137 will then contact with the cam finger which will release the latch from the cross head, and the cross head will move on for retracting the feed bars and position the dogs for the next feeding movement.

The control bar is moved in the opposite direction for permitting the mandrel to contract or collapse by the upward movement of the mandrel after the bumping operation. Mounted on the bracket 31 is an arm 139. This arm 139 engages beneath a shoulder 140 on a latch bar 141 when the bracket is in its lowest position. A spring 142 moves the latch bar to this position. When the bracket 31 is moved upward, the arm 139 will move the latch bar vertically in an upward direction. The latch bar is pivoted at 143 to an arm 144 carried by a lever, the upper end 145 of which is adapted to engage a bar 146 which is fixed to the control rod 27. This upward movement of the latch bar 141 will swing the lever, causing the upper end thereof to move to the right as seen in Figures 6 and 10, and said upper end contacting with the bar 146 will move the control bar 27 so as to release the mandrel and permit it to contract through the action of the yielding shoes thereon. The contracting of the mandrel releases the can body, and also the lifting of the mandrel releases the can body from the lower anvil. Therefore, the feed bars on their next forward movement to place blanks on the mandrel, will strip the mandrel of the finished can body.

The operation of the machine is thought to be obvious from the description which has been given. The body blanks are placed on the receiving horse by the operator with the upper edge portions of the body blanks interlocked. After the blanks have been placed on the receiving horse, the remaining operations of the machine are all automatic. The feed dogs engage the blanks and carry them forward, and they are guided in their forward movement so as to bring their lower edge portions adjacent each other as the body blanks are moved on to the mandrel. The yielding fingers contacting with the body blanks will force the same back against the gauging fingers and this insures that the edges of the blanks are in alinement. The presser shoes at the sides yield to permit the placing of the blanks and proper positioning of the blanks on the mandrel. The movable wing members then operate to interlock the lower edge portions of the body blanks, after which the mandrel is expanded for firmly interlocking the edges and holding the same interlocked preparatory to bumping. The retracting movement of the feed bars brings about the expansion of the mandrel, and when the control bar is released, it will stay in its set position. The downward movement of the mandrel and the punch or bumping member 11 bring about a bumping or compressing of the side seams, after which the mandrel is raised, which not only releases the body from the lower anvil, but it also operates the control bar to permit the contraction of the mandrel, and this releases the finished body so that it is ready to be stripped from the mandrel. As the feed bars bring the next pair of body blanks on to the mandrel, they will strip the finished can body from the mandrel.

It is obvious that many changes may be made in the details of construction and the arrangement of the parts without departing from the spirit of the invention as set forth in the appended claims.

Having thus described the invention, what we claim as new and desire to secure by Letters Patent, is—

1. A can body maker comprising a main punch, a main anvil, a mandrel disposed between the anvil and punch and having an auxiliary anvil positioned to cooperate with said main punch and an auxiliary punch positioned to cooperate with said main anvil, means for automatically feeding a pair of can body blanks on to one end of said mandrel for the bumping of the side seams and off the other end thereof after said seams are bumped, gauge fingers against which the edges of the blanks are placed for alining said edges, means for expanding the mandrel, means for reciprocating the main punch, and means for moving the mandrel with the main punch for simultaneously bumping the side seams joining the blanks.

2. A can body maker comprising a main punch, a main anvil, a mandrel disposed between the anvil and punch and having an auxiliary anvil positioned to cooperate with said main punch and an auxiliary punch positioned to cooperate with said main anvil, means for automatically feeding a pair of can body blanks on to one end of said mandrel for the bumping of the side seams and off the other end thereof after said seams are bumped, gauge fingers against which the edges of the blanks are placed for alining said edges, means cooperating with the mandrel for the interlocking of the edges of the blank between the auxiliary punch and the main anvil, means for reciprocating the main punch, and means for moving the anvil with the main punch for simultaneously bumping the side seams joining the blanks.

3. A can body maker comprising a main punch, a main anvil, a mandrel disposed between the anvil and punch and having an auxiliary anvil positioned to cooperate with said main punch and an auxiliary punch positioned to cooperate with said main anvil, means for automatically feeding a pair of can body blanks on to one end of said mandrel for the bumping of the side seams and off the other end thereof after said seams are bumped, a yielding presser bar cooperating with the mandrel for holding the interlocked edges of the blanks in contact with the auxiliary anvil, presser shoes cooperating with the mandrel for holding the side portions of the body blanks in contact with the mandrel, wing members cooperating with the mandrel for interlocking the edges of the blanks between the auxiliary punch and the main anvil, means for expanding the mandrel, means for reciprocating said main punch, and means for moving the mandrel with the main punch for simultaneously bumping the side seams joining the blanks.

4. A can body maker comprising a main punch, a main anvil, a mandrel disposed between said punch and anvil and having an auxiliary anvil positioned to cooperate with said main punch and an auxiliary punch positioned to cooperate with said main anvil, a receiving horse associated with said main anvil on which the body blanks may be placed with one pair of hooks interengaged for forming a side seam, guides for directing said body blanks along said horse and on to the mandrel, means for feeding the body blanks intermittently along said horse and on to the mandrel including reciprocating feed bars carrying yielding feed dogs, means for positioning said body blanks on the mandrel with their end edges in alinement, means cooperating with the mandrel for interlocking the hooks of the body blanks beneath the mandrel, means for reciprocating said main punch, and means for moving the mandrel with the main punch for simultaneuosly bumping the side edges joining the blanks.

5. A can body maker comprising a main punch, a main anvil, a mandrel disposed between said punch and anvil and having an auxiliary anvil positioned to cooperate with said main punch and an auxiliary punch positioned to cooperate with said main anvil, a receiving horse associated with said main anvil on which the body blanks may be placed with one pair of hooks interengaged for forming a side seam, guides for directing said body blanks along said horse and on to the mandrel, means for feeding the body blanks intermittently along said horse and on to the mandrel including reciprocating feed bars carrying yielding feed dogs, gauge fingers carried by said mandrel over which the body blanks are passed as they are moved on to the mandrel, yielding arms contacting with the body blanks and moving the same rearwardly against the gauge fingers when released by the feed dogs, means cooperating with the mandrel for interlocking the hooks of the body blanks beneath the mandrel, means for reciprocating said main punch, and means for moving the mandrel with the main punch for simultaneously bumping the side seams joining the blanks.

6. A can body maker comprising a main punch, a main anvil, a mandrel disposed between said punch and anvil and having an auxiliary anvil positioned to cooperate with said main punch and an auxiliary punch positioned to cooperate with said main anvil, a receiving horse associated with said main anvil on which the body blanks may be placed with one pair of hooks interengaged for forming a side seam, guides for directing said body blanks along said horse and on to the mandrel, means for feeding the body blanks intermittently along said horse and on to the mandrel including reciprocating feed bars carrying yielding feed dogs, yieldingly operated presser shoes adapted to hold the body blanks against the mandrel, yielding gauge fingers carried by the mandrel over which the body blanks are fed, means for engaging the body blanks for moving the same rearwardly against the gauge fingers when released by the feed dogs, means cooperating with the mandrel for interlocking the hooks of the body blanks beneath the mandrel, means for expanding the mandrel, means for reciprocating the main punch, and means for moving the mandrel with the main punch for simultaneously bumping the side seams joining the blanks.

7. A can body maker comprising a main punch, a main anvil, a mandrel disposed between said punch and anvil and having an auxiliary anvil positioned to cooperate with said main punch and an auxiliary punch positioned to cooperate with said main anvil, a receiving horse associated with said main anvil on which the body blanks may be placed with one pair of hooks interengaged for forming a side seam, guides for directing said body blanks along said horse and on to the mandrel, means for feeding the body blanks intermittently along said horse and on to the mandrel including reciprocating feed bars carrying yielding feed dogs, yieldingly operated presser shoes adapted to hold the body blanks against the mandrel, yielding gauge fingers carried by the mandrel over which the body blanks are fed, means for engaging the body blanks for moving the same rearwardly against the gauge fingers when released by the feed dogs, means cooperating with the mandrel for interlocking the edges of the body blanks between the auxiliary punch and the main anvil, means for expanding the mandrel, and means for operating the main punch and the mandrel for simultaneously bumping the side edges joining the blanks.

8. A can body maker comprising a main punch, a main anvil, a mandrel disposed between the punch and the anvil, a bracket supporting said mandrel, a supporting horse attached to said bracket on which the can body blanks with one pair of hooks interengaged may be placed and fed on to the mandrel, reciprocating feed bars carried by said horse, yielding dogs carried by said feed bars for engaging the blanks and feeding the same intermittently on to the mandrel, justifying means associated with the mandrel for alining the end edges of the blanks, means cooperating with the mandrel for interlocking the hooks of the body blanks beneath the mandrel, and means for reciprocating said main punch for bumping the upper side seam against the mandrel and causing the mandrel to bump the lower side seam against the anvil.

9. A can body maker comprising a main punch, a main anvil, a mandrel disposed between the punch and the anvil, a bracket supporting said mandrel, a supporting horse attached to said bracket on which the can body blanks with one pair of hooks interengaged may be placed and fed on to the mandrel, reciprocating feed bars carried by said horse, yielding dogs carried by said feed bars for engaging the blanks and feeding the same intermittently on to the mandrel, justifying means associated with the mandrel for alining the end edges of the blanks, means cooperating with the mandrel for interlocking the hooks of the body blanks beneath the mandrel, means for reciprocating the main punch, and means for moving said bracket for raising and lowering the mandrel, whereby the lower side seam is brought into contact with the main anvil permitting the main punch to simultaneously bump the side seams joining the blanks.

10. A can body maker comprising a main punch, a main anvil, a mandrel located between said punch and anvil adapted to receive a pair of can body blanks for forming a can body, said mandrel including a central web, an auxiliary anvil mounted at the upper side thereof for cooperation with the main punch, an auxiliary punch carried by said web at the lower side thereof for cooperation with the main anvil, said mandrel including side supporting members, engaging, respectively, the can body blanks at the inner face thereof, yielding presser shoes cooperating with said side supporting members, means for interlocking the edges of the blanks beneath the auxiliary punch, yielding means for moving said side supporting members outwardly, a control bar having cam faces for positively imparting movement to said last-named means, and means for moving said control bar to different set positions whereby said side members are held in a position for expanding the can body and also held in a contracted position for receiving the body blanks.

11. A can body maker comprising a main punch, a main anvil, a mandrel disposed between said punch and said anvil on which can body blanks may be placed for side seaming at the opposite sides of the can body, means for expanding said mandrel including a control bar movable to different set positions for holding the mandrel expanded or for permitting the mandrel to be contracted, a feeding mechanism for feeding the body blanks on to the mandrel including feed bars, a latch attached to the control bar and adapted to be engaged by a member moving with the feed bars for the expanding of the mandrel, and means for releasing said latch from the feed bar operating means after the mandrel is expanded.

12. A can body maker comprising a main punch, a main anvil, a mandrel disposed between said punch and said anvil on which can body blanks may be placed for side seaming at the opposite sides of the can body, means for expanding said mandrel including a control bar movable to different set positions for holding the mandrel expanded or for permitting the mandrel to be contracted, a feeding mechanism for feeding the body blanks on to the mandrel including feed bars, a latch attached to the control bar and adapted to be engaged by a member moving with the feed bars for the expanding of the mandrel, means for releasing said latch from the feed bar operating means after the mandrel is expanded, means for raising and lowering the mandrel to position the blanks for bumping, and means operated by the raising of the mandrel for shifting said control bar to release the mandrel so that it may be contracted.

13. A can body maker comprising a main punch, a main anvil, a mandrel located between said punch and anvil, a receiving horse attached to said mandrel on which can body blanks to be joined by side seams at the opposite sides thereof may be placed and fed on to the mandrel, feed bars, yielding feed dogs carried by said feed bars, means for reciprocating the feed bars for feeding the blanks on to the mandrel for the bumping of the same and for feeding the can body after the edges are bumped off from said mandrel, justifying means associated with the mandrel including yielding gauge fingers over which the body blanks are fed on to the mandrel, and yielding arms adapted to be engaged by said blanks for moving the same rearwardly into contact with said gauge fingers when released by the feed dogs.

14. A can body maker comprising a main punch, a main anvil, a mandrel located between said punch and anvil, a receiving horse attached to said mandrel on which can body blanks to be joined by side seams at the opposite sides thereof may be placed and fed on to the mandrel, feed bars, yielding feed dogs carried by said feed bars, means for reciprocating the feed bars for feeding the blanks on to the mandrel for the bumping of the same and for feeding the can body after the edges are bumped off from said mandrel, justifying means associated with the mandrel including yielding gauge fingers over which the body blanks are fed on to the mandrel, yielding arms adapted to be engaged by said blanks for moving the same rearwardly into contact with said gauge fingers when released by the feed dogs, means for interlocking the side edges of the body blanks beneath the mandrel, means for expanding the mandrel for holding said side edges interlocked, means for reciprocating the punch, and means for moving the mandrel with the punch for causing the side edges beneath the mandrel to contact with the anvil whereby the punch will bump the side seam at the upper side of the mandrel against the mandrel and bump the side seam at the lower side of the mandrel against the anvil therebeneath.

JOSEPH J. ENGELMAN.
JOHN HENCHERT.
GREELEY BAKER.